United States Patent

[11] 3,563,560

[72] Inventor Robert C. Johnson
 9 Flower Court, Lakeside Park, Ky.
[21] Appl. No. 783,644
[22] Filed Dec. 13, 1968
[45] Patented Feb. 16, 1971

[54] CHUCK ASSEMBLY
 8 Claims, 5 Drawing Figs.
[52] U.S. Cl. ..................................................... 279/67;
 77/68, 77/60; 83/698
[51] Int. Cl. ........................................................ B23b 31/04,
 B23b 31/10
[50] Field of Search .......................................... 279/44, 66,
 67, 9, 112; 83/698; 287/118; 112/226

[56] References Cited
UNITED STATES PATENTS
254,975 3/1882 Holmes
FOREIGN PATENTS
375,649 4/1964 Switzerland.................. 77/60
OTHER REFERENCES
PUBLICATION: AMERICAN MACHINIST, Vol. 37, No. 11, dtd 1912, page 454, Article entitled " Machine Top Chuck" by Jean Jean.

Primary Examiner—Francis S. Husar
Attorney—Pearce, and Schaeperklaus

ABSTRACT: A chuck assembly and deep hole tool therewith, the chuck comprising a head, a shank and a centrally aligned bore for supporting the tool. A pair of complementary plugs are mounted in the head of the chuck in a bore diametrically extending therethrough. A dowel pin is disposed in the head offset to its axis, and attaches the first plug thereto. An allen screw, exposed to the peripheral exterior of the chuck assembly, extends through the second plug into the first plug, generally at right angles to the line of the dowel pin, whereby the second plug is drawn towards the first plug upon tightening said screw and thereby securely seats both plugs to within the head of the chuck. Corresponding grooves in the central faces of the plugs are provided for engaging the shank of the tool tightly held by such chuck assembly.

The tool itself comprises a cutting tip brazed to an elongated shank, a second shank integrally formed upon the first and having a greater diameter thereover, and a third shank integrally formed upon the second shank and having a greater diameter therefrom. A pair of O-rings are spacedly mounted in their respectively annular grooves about the periphery of the third shank whereby upon insertion of the third shank in a spindle mounted in a stock of a tooling machine, seepage of coolant and lubricating oil about the tool's shank is prevented and all such oil flows within the tube's bore to the cutting tip itself.

PATENTED FEB 16 1971 3,563,560
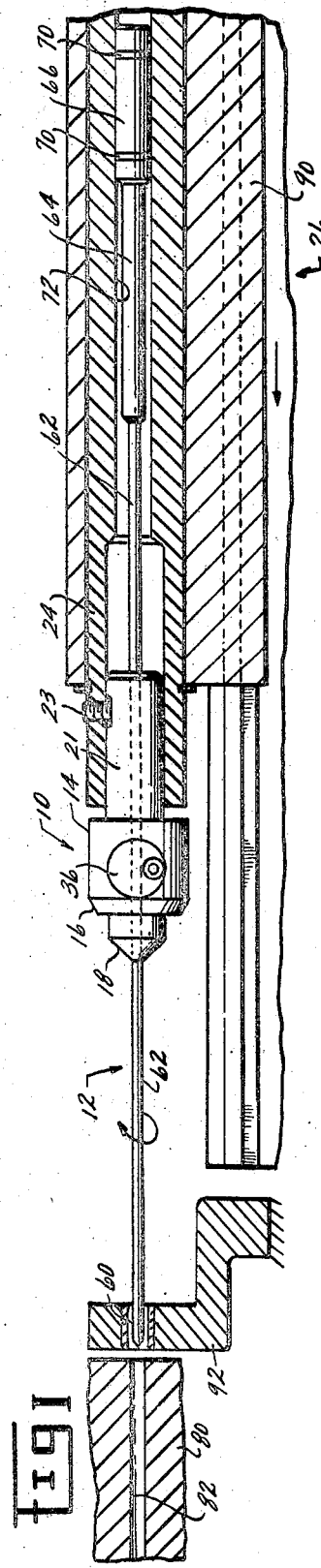
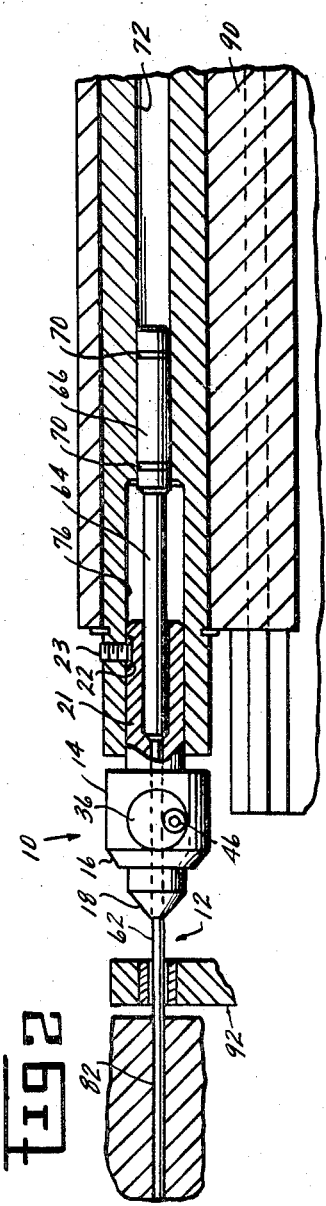
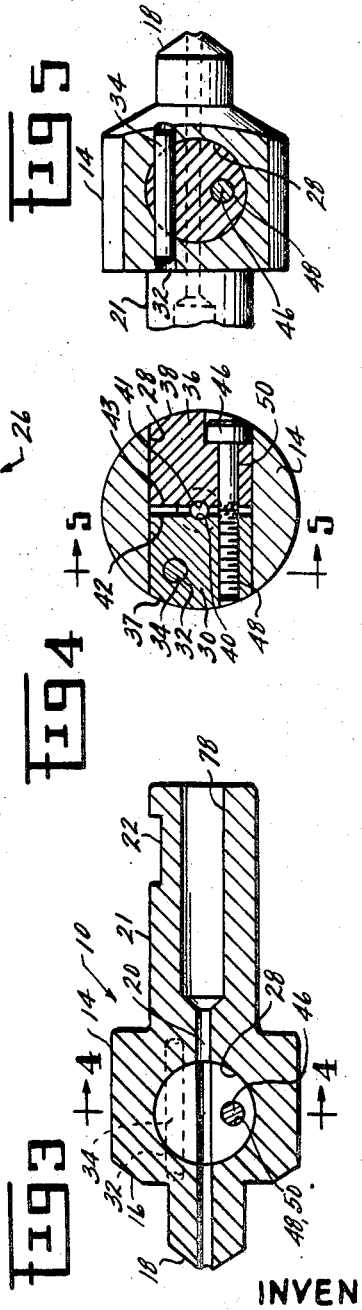
INVENTOR
ROBERT C. JOHNSON
Pearce and Schaeperklaus
ATTORNEYS—

3,563,560

CHUCK ASSEMBLY

BACKGROUND OF THE INVENTION

1. Field of the Invention

The field of art to which the invention is most likely to pertain is generally located in the classes of art relating to chuck assemblies and drill tools. Class 279, Chucks and Sockets, and Classes 77 and 81, Boring and Drilling, and Tools, respectively, U.S. Patent Office Classifications, appear to be the appropriate general areas of art in which the claimed subject matter of the type involved here has been classified in the past.

2. Description of the Prior Art

Chuck assemblies and tools or bits therefor, the arts to which this invention most likely pertains are disclosed in the following U.S. Pat. Nos. 50,593; 677,198; and 1,189,727.

SUMMARY

This invention relates to improvements in a chuck assembly and a tool for boring long and comparatively small diametered holes in metal objects, conventionally known as gun drilling, and particularly relates to a chuck assembly for such a tool and the tool itself.

The term "gun drilling," although a misnomer, is derived from the practice of drilling long holes in gun barrels to extremely exacting tolerances. The term "gun drilling" has persisted, notwithstanding the fact that precise drilling is no longer limited to the production of gun barrels, with the modern connotation including all precise boring operations which require a gun-type drill.

Gun drills have been found satisfactory to perform precise boring jobs in a wide variety of metals; however, many problems still exist which are common to those engaged in the business of precision boring of deep and long holes.

In boring holes of considerable depth, it is necessary to interchange drills from time to time as the depth of the hole increases with each passing of the drill. What this involves is retraction of the drill from the workpiece, removal thereof from its chuck assembly, insertion of a drill having a longer shank into the chuck assembly, and then proceeding to make the next pass into the workpiece whereby the depth of the hole is again increased. This time to exchange drills is considerable and increases the cost of manufacture of the workpiece.

Consequently, an object of this invention is to provide for a chuck assembly whereby entire retraction or removal from the workpiece of a drill is eliminated.

A further object of the invention is to provide for use of a drill having a great length of shank attached thereto, so that interchanging of drills is no longer required, but only an attachment at a different point along the extended length of a shank of the same drill is necessary.

Another object of this invention is to provide for a novel chuck assembly.

A still further object of the invention is to provide for a novel drill.

Another object of the invention is to provide for reduction of the number of stock drills of all lengths to just a few of the longer lengths of such gun drills, as the chuck assembly of this invention provides for the use of long drills in making holes of a very short depth.

Another object of this invention is to provide for a highly efficient flow of lubricating oil through the drill.

These and other objects of the invention will become more apparent upon a complete reading of the following description, appended claims thereto, and the accompanying drawing comprising one sheet.

BRIEF DESCRIPTION OF THE DRAWING

FIG. 1 is an elevational view, partly in section, of the chuck assembly and drilling tool utilized therewith and embodying this invention, in one operable position in a gun drilling machine.

FIG. 2 is an elevational view, partly in section, of the chuck assembly and drill shown in FIG. 1 in a second operable position in the gun drilling machine.

FIG. 3 is a sectional view of the chuck assembly embodying the invention.

FIG. 4 is a view taken on line 4—4 of FIG. 3.

FIG. 5 is a view taken on line 5—5 of FIG. 4.

DESCRIPTION OF THE PREFERRED EMBODIMENT

Referring now to the drawing in which reference characters therein correspond to like numerals hereinafter contained in this specification, reference character 10 refers to the chuck assembly and reference character 12 refers to the deep hole drill. Chuck assembly 10 comprises a cylindrical head 14, preferably tapered towards its front end 16, and having a cap or reduced portion 18 formed at and extending from front end 16, and being cylindrically aligned to head 14. Chuck assembly 10 further includes cylindrical shaft 21 centrally aligned with head 14. A central bore 20 extends axially throughout head 14, cap 16 and shaft 21. Shaft 21 is sufficiently long so as to include a flat 22 for attachment by means of a setscrew 23 radially mounted in a rotatable spindle 24 of a gun drilling machine 26. The head, shaft and cap are preferably integrally formed by machining a single metallic piece thereto.

A diametrically formed second bore 28 extends throughout head 14 at a right angle to its major or longitudinal axis. A first plug 30 is slip-fitted in bore 28, filling substantially one-half thereof. A dowel pin bore 32 is provided in head 14 parallel to its major axis and is offset to such axis. Bore 32 opens to the front face of head 14 and extends rearwardly thereinto. A dowel pin 34 is seated in dowel pin bore 32, and upon assembly of chuck assembly 10, passes through the body of plug 30 to retain the latter in bore 28.

A second plug 36 is also slip-fitted to bore 28 from the side of head 14 opposing the side thereof from which plug 30 is inserted, filling substantially one-half of bore 28, thereby being in alignment with its complementary plug 30. The rearward faces 37, 38 of complementary plugs 30, 36, respectively, are preferably machined so as to be flush with the annular periphery of head 14. Each plug 30, 36 includes a groove 40, 41, respectively, in its centrally disposed and facing wall 42, 43, respectively. Each groove 40, 41 extends throughout the depth or width of its respective plug in a line parallel to the major axis of head 14, and generally corresponds to the shape of one-half of a shank of the deep hole tool 12 which cooperates with each of such grooves after assembly of chuck assembly 10 and during operation of such chuck assembly and tool upon a workpiece for drilling a deep hole in the latter.

Means such as an Allen screw 46 is provided for drawing together plugs 30, 36 in bore 28 and about tool 12 preparatory to use thereof. A pair of aligned holes 48, 50 are disposed in the bodies of plugs 30, 36, respectively, their coincident axes being parallel to but offset to the axes of such plugs. Allen screw 46 is threaded into plug 30 through hole 50 of plug 36 in assembly of chuck assembly 10 whereby plug 36 is drawn towards plug 30 (retained by dowel pin 34) upon tightening thereof, thereby providing for grooves 40, 41 to grip the shank of tool 12 mounted in and throughout bore 20 of chuck assembly 10.

Gun drilling tool 12 comprises a cutting tip 60 securely mounted on an elongated shank 62, a second shank 64 having a diameter greater than that of shank 62, and a third shank 66 having a diameter greater than that of second shank 64. Tip 60 is preferably brazed in conventional fashion to shank 62. Also made in customary fashion is formation of a bore (not shown) in tool 12 extending from its rear to its cutting tip 60 together with a slot longitudinally extending the length of shank 62, such as disclosed in U.S. Pat. No. 1,189,727, and which does not form a part of the present invention, whereby cooling lubricant flows to and from the cutting tip during operation of deep hole drilling in a workpiece.

Also included in tool 12 is a pair of O-rings 70, each spaced from the other and being annularly mounted upon the third shank 66 thereof. O-rings 70 provide for sealing of tool 12 in a bore 72 provided in spindle 24 and prevents seepage of coolant which otherwise would flow through bore 72 and around tool 12 to the exterior of spindle 24. Such O-ring mountings provide for a more efficient use of the flow of the coolant oil during a gun drilling operation. In the past, oil has leaked by a tool having but a single shank, and as a result, a less efficient cooling condition occurred. However, in this invention, such problem is removed.

Spindle 24 thus appropriately provides for a bore 72 of a size along which O-rings 70 slidably fit, thereby forcing all flow of coolant and lubricating oil into the tool bore (not shown) and to its cutting tip. An enlarged spindle bore 76 is provided adjacent its end into which shank 21 of chuck assembly 10 is secured by setscrew 23. A rearwardly-extending enlarged bore 78, in axial alignment with bore 20 in head 14, is provided in shank 21 for terminal axial disposition of second shank 64 of tool 12 so that O-rings 70 continue to efficiently function in bore 72 during the last pass a particular deep-hole drilling tool 12 may make in a given operation in a gun drilling machine 26.

The concept of and claim to the patentable invention extends to substitution of an adapter for spindle 24, in which case such adapter may be conventionally keyed or otherwise suitably secured to a rotatable spindle in gun drilling machine 26.

The assembly of chuck assembly 10 and deep-hole drilling tool 12 should now be apparent from the above description. Shank 62 of tool 12 is inserted through the rear of shank 21 of chuck assembly 10 while complementary plugs 30, 36 are loosely held in bore 28 by Allen screw 46 and dowel pin 34. Thereafter, Allen screw 46 is tightened along a desired point of shank 62 preparatory to a first pass, usually a short one, into a workpiece 80 for making a deep hole 82 therein. Third shank 64 and chuck assembly 10 are then inserted into spindle 24 until flat 22 of shank 21 is aligned with setscrew 23 in spindle 24 so as to fasten chuck and tool thereto. Further adjustment of the exposed length of shank 62 of tool 12 may then be undertaken should it be desired to shorten or lengthen such exposed portion, merely by loosening and tightening Allen screw 46 accordingly.

Thereafter, in operation, spindle 24, slidably reciprocable with subbase 90 of gun drilling machine 26, is caused to rotate with advancement as shown by the arrow in FIG. 1 of spindle 24 towards workpiece 80. Tip 60 passes through an initial guide means 92 suitably mounted on gun drilling machine 26 and begins to bore hole 82 in workpiece 80.

After the first pass of tool 12, which is limited by the extent of an exposed portion of shank 62 to the left of guide means 92 as cap 18 contacts the latter, subbase 90 is retracted sufficiently so that thereafter, Allen screw 46 is loosened and a sufficient and an additional portion of shank 62 of tool 12 is exposed. Again, Allen screw 46 is tightened so that shank 62 is secured between plugs 30, 36. Advancement of subbase, rotatable spindle and chuck assembly is again caused thereby making a second pass into hole 82 of workpiece 80, causing a deeper hole to be drilled thereby, the walls of the depth of hole 82 made in the first pass supporting shank 62. This procedure is repeated a sufficient number of times so as to drill to a desired depth for hole 82. Thus, needless interchange of longer and longer tools for gun drilling is eliminated, and is otherwise reduced only because of the limitation of the length of shank 62 of tool 12.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

I claim:

1. A chuck assembly for holding a tool for drilling a hole in a metallic workpiece, said chuck assembly comprising:

a head, a shaft mounted on said head, and an axially aligned bore throughout said head and shaft;

a pair of complementary plugs disposed in a diametrically formed bore in said head and having corresponding grooves facing each other and disposed in general alignment with said aligned bore;

means for drawing together said plugs for securing the tool to said chuck assembly;

means for attaching at least one of said plugs to said head; and whereby the tool is held in the axially aligned bore by the plugs.

2. The combination of claim 1 in which said attaching means is a dowel pin mounted in a bore in said head and generally parallel to said aligned bore and passing through a corresponding bore in said one of said plugs.

3. The combination of claim 1 in which said drawing means comprises screw-threaded means connecting together said plugs.

4. The combination of claim 1 in which said attaching means is a dowel pin mounted in a bore in said head and generally parallel to said aligned bore and passing through a corresponding bore in said one of said plugs, and in which said drawing means comprises screw-threaded means connecting together said plugs.

5. A chuck assembly comprising:

a head;

a shaft mounted on said head;

a centrally aligned bore throughout said head and shaft;

a pair of complementary plugs disposed in a diametrically formed bore in said head;

means mounted in the central faces of said plugs and in alignment with said aligned bore for securely grasping a shank or the like of a tool;

means for attaching at least one of said plugs in a stationary position to said head; and means for drawing together said plugs whereby such shank or the like is held by said grasping means.

6. The combination of claim 5 in which said attaching means is a dowel pin mounted in a bore in said head and generally parallel to said aligned bore and passing through a corresponding bore in said one of said plugs.

7. The combination of claim 5 in which said drawing means comprises screw-threaded means connecting together said plugs.

8. The combination of claim 5 in which said attaching means is a dowel pin mounted in a bore in said head and generally parallel to said aligned bore and passing through a corresponding bore in said one of said plugs, and in which said drawing means comprises screw-threaded means connecting together said plugs.